United States Patent [19]
Schaefer

[11] 3,903,456
[45] Sept. 2, 1975

[54] PROTECTOR SYSTEM FOR AN ELECTRIC MOTOR

[75] Inventor: Edward J. Schaefer, Bluffton, Ind.

[73] Assignee: Franklin Electric Co., Inc., Bluffton, Ind.

[22] Filed: Jan. 28, 1974

[21] Appl. No.: 436,880

[52] U.S. Cl.......... 317/13 B; 317/11 E; 317/36 TD; 317/54; 318/472
[51] Int. Cl.²......................................... H02H 7/08
[58] Field of Search...... 317/54, 13 C, 36 TD, 13 B, 317/11 E; 318/472

[56] References Cited
UNITED STATES PATENTS

| | | | |
|---|---|---|---|
| 3,588,605 | 6/1971 | Casson | 317/11 E |
| 3,761,794 | 9/1973 | Quinlisk et al. | 317/13 B |

*Primary Examiner*—James D. Trammell
*Attorney, Agent, or Firm*—Hibben, Noyes & Bicknell

[57] ABSTRACT

This disclosure deals with a protection circuit for an electric motor, the motor being connected by power lines to a power supply. A thermal protector switch is connected in at least one of the lines and is mounted closely adjacent at least one of the windings of the motor, and a main contactor is connected in the lines to control the flow of power to the motor. The circuit includes means for responding to the opening of the protector switch by sensing the absence of current flow in the power line to which it is connected, and for actuating the main contactor to open the power lines. The protection circuit further includes means for preventing automatic reapplication of power to the motor even though the protector switch is automatically resettable, thereby requiring manual resetting of the circuit. In the case of a three phase motor, the circuit enables the use of a single protector switch thereby avoiding problems due to random resetting of plural protection switches.

15 Claims, 8 Drawing Figures

PROTECTOR SYSTEM FOR AN ELECTRIC MOTOR

Electric motors, both single phase and three phase, have been provided with on-winding thermal protector switches which are useful because of their simplicity and low cost. Such a switch is connected in one of the power lines, with the result that the switch opens and stops current flow to a motor winding in the event the switch becomes overheated. Such a protector switch has been used extensively on small size motors, but a recent development, as described in the E.J. Schaefer et al. U.S. application Ser. No. 354,694, filed Apr. 26, 1973, extends the range of usefulness of such a protector switch.

Problems may be encountered when using such a thermal protector switch because of the fact that they automatically reset or reclose after the motor has cooled to normal temperatures. Lower rated motors have been equipped with automatic reset protector switches, but the higher rated motors have not included them because a manual reset is preferred. Repeated resetting when there is a continuing fault could result in damage to the motor, particularly in larger size motors.

In a three phase motor, a protector switch is provided for each phase because a single protector switch will not protect the motor from damage due to single phase motor operation when one line opens. If a number of protector switches are used in a three phase motor, random resetting of the switches might also present a problem. A device may be installed in the motor to protect against random resetting, but severe space limitations within a three phase motor make it difficult to mount such components within the motor enclosure.

It is therefore a general object of the present invention to provide a control circuit for an electric motor, which will eliminate the foregoing disadvantages.

A circuit in accordance with the present invention is designed for use with an electric motor connected to a power supply by power lines, the circuit including a thermal protector switch connected in a selected line and mounted closely adjacent a motor winding, current sensing means coupled to at least one of said lines, including said selected power line for sensing and presence or absence of current flow therethrough, a main contactor connected in said power lines for controlling the application of power to said motor, said current sensing means being connected to said contactor for actuating said contactor to open said lines in the absence of current flow through said lines. The circuit may further include means for preventing automatic reenergization of the motor after said switch opens.

The foregoing and other objects and advantages of the invention will be better understood from the following detailed description taken in conjunction with the accompanying figures of the drawings, wherein:

FIGS. 2 and 3 are diagrams of three phase systems similar to FIG. 1 but illustrating alternate forms of the invention;

FIG. 4 is a diagram of a single phase system including a circuit embodying the invention;

FIG. 5 is a diagram similar to FIGS. 1 to 3 but showing an additional form of the invention;

Figure 1:
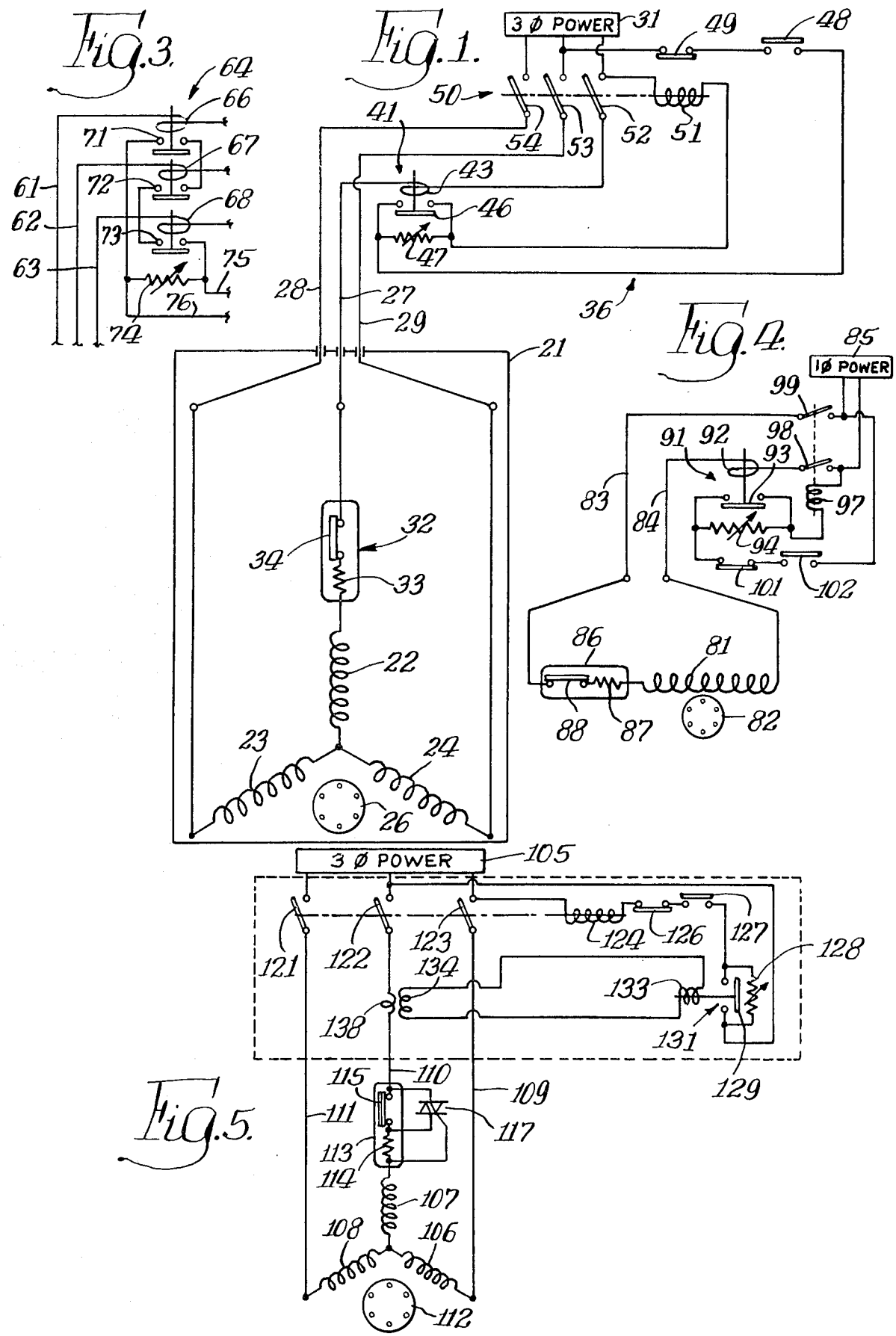
FIG. 1 is a diagram of a three-phase electric system including a circuit embodying the present invention.

FIG. 1 illustrates a circuit constructed in accordance with the present invention, used in conjunction with a three-phase electric motor. While a circuit in accordance with this invention may be used with other types of loads, only electric motor loads are illustrated and described herein. The motor includes a housing 21 having three windings 22, 23 and 24 mounted therein, the windings 22 to 24 driving a rotatably mounted rotor 26. The three windings 22 to 24 are connected by three power lines 27, 28 and 29 to be energized by a three phase AC power supply 31. The construction of the three windings 22 to 24, the housing 21 and the rotor 26 may be conventional in construction and do not form part of the present invention.

Connected between the winding 22 and the power line 27 is a heat responsive overload switch 32 which is referred to herein as a thermal protector switch. The switch 32 comprises, in the present example, a heater element 33 and switch contacts 34 which are normally closed at normal motor temperatures but which open when the temperature of the switch rises above a predetermined switching temperature. The contacts 34 may for example be actuated by a bimetal element which flexes when heated and interrupts the power circuit to the winding 22. The element 33 is also connected in the power circuit and heats the contacts 34 when current flows through the line 27. Thus, the contacts 34 may be heated to the opening temperature either by the element 33 or by the windings 22 to 24. The switch 32 is an automatic reset type wherein the contacts 34 automatically reclose as soon as the temperature of the switch 32 falls below its switching temperature. The thermal protection switch 32 is mounted, as shown in FIG. 1, within the motor housing 21, and it is mounted on the windings. In a three phase motor, it is preferably mounted in close proximity to two of the three windings 22 to 24 and as close as possible to the third of the three windings. Thus, the switch 32 responds to overheating of any of the three windings 22 through 24 and will open the contacts 34 in such event. In the event the contacts 34 open, a control circuit 36 responds to the absence of current flowing through the line 27 and opens all three power lines 27 to 29. The power lines are opened by a contactor 50 including a coil 51 and three contacts 52 to 54 connected in the lines 27 to 29.

The control circuit 36 comprises a control relay 41 including a coil 43 and contacts 46. The coil 43 is formed, in the present instance, by a loop in the power line 27 and because of the amount of current flowing through the power lines, a single loop in the power line 27 would normally be sufficient. The coil 43 operates a plunger connected to the contacts 46. A timing device 47 is connected across the contacts 46, and in the present instance, the timing device 47 comprises a positive temperature coefficient (PTC) resistor. Connected to one side of the contacts 46 are normally open start contacts 48 and normally closed stop contacts 49. The contacts 48 and 49 may, for example be relay operated or manually operated. In the case where the motor 21 is coupled to drive a water pump, the switch 48 could be connected to be automatically operated by a water pressure responsive device. Connected to the other side of the contacts 46 is the coil 51 of the main contactor 50, which operates the contacts 52, 53 and 54. The components 47, 48, 49 and 51 are connected in series and across the power lines 27 and 29, between the contacts 52 and 53 and the power supply 31.

The timing device 47 is provided to enable the contactor 50 to be controlled by the start contacts 48 as will be explained, and any timing device may be used which will complete the circuit through the coil 51 when the start contacts 48 are closed. The timing device 44 should carry current for a fraction of a second to enable the contacts 52 to 54 to close.

If the contacts 48 and 49 and the contacts 46 are closed, current will flow through the coil 51 causing the three contacts 52 to 54 to close. In these circumstances, and assuming that the contacts 34 are also closed, three-phase power will be supplied to the three windings 22 to 24 of the motor. No current flows through the resistor 47 because it is shorted by the closed contacts 46. On the other hand, if the contacts 46 open when the contacts 48 and 49 are closed, the resistor 47 will conduct current for a short length of time, until the temperature of the resistor 47 rises due to self heating to above its critical or transition level at which time its resistance rises sharply and is sufficiently great that the current flow drops below the level needed to hold the three contacts 52 to 54 closed, and the contactor 50 then opens the lines.

When current flows through the line 27 and the coil 43, force is applied to the control relay plunger in a direction to close the relay contacts 46. If the contacts 34 of the switch 32 were to open, or if the line 27 or the winding 22 were to open for any reason, the two windings 23 and 24 would, if it were not for the control circuit 36, operate as a single phase motor. However, with no current flow in the line 27 and the coil 43, the force on the relay plunger is zero and the relay contacts 46 then open.

Considering the operation of the motor circuit shown in FIG. 1, assume that the motor has been turned off for some time. The thermal protection switch 32 is then at normal temperature and the contacts 34 are closed, and the PTC resistor 47 is also at normal temperature. The stop contacts 49 are normally closed and the start contacts 48 are open. With the contacts 48 open, no current flows through the coil 51 and therefore the contacts 52 to 54 are open, and since no current flows through the coil 43, the contacts 46 are also open. The open contacts 48 prevent current flow through the timing device 47.

To start the motor, the contacts 48 are closed by any suitable method. Current then flows from the power lines 27 and 29, through the closed contacts 48 and 49, through the PTC resistor 47, and through the main contactor coil 51. Current is able to flow through the PTC resistor 47 because, as previously mentioned, its resistance is low at normal temperatures. The current flow through the coil 51 closes the contacts 52 and 54 and three phase power is then applied to the three phase windings 22 to 24 to drive the motor. The power current flow through the loop 43 immediately closes the contacts 46, so that current continues to flow through the coil 51. The resistor 47 is then shorted, and since no current flows through it, its temperature returns to a normal value. In normal operation, the motor remains energized until the contacts 48 are opened to stop current flow through the contactor coil 51.

Assume that the contacts 34 open due, for example, to overheating of one of the windings 22 to 24 from an overload of the motor. As soon as the contacts 34 open, current stops flowing through the coil 43, and the two motor windings 23 and 24 continue in single phase operation. The force on the plunger of the control relay 41 falls to zero, resulting in opening of the contacts 46. Even though the contacts 46 are open, current continues to flow through the coil 51 for a short time because current then flows through the PTC resistor 47 for the length of time necessary for it to heat to its critical or transition temperature, at which point its resistance rises sharply and drops the current flow through the coil 51 to below the point where it holds the contacts 52 to 54 closed. When the contacts 52 to 54 open, power is disconnected from the remaining two motor windings 23 and 24.

Even if the contacts 48 and 49 remain closed and the motor is off sufficiently long for the temperature of the protection switch 32 to close the contacts 34 once again, power will nevertheless not be connected to the motor because insufficient current will flow through the PTC resistor 47 and the contactor coil 51 to close the contacts 52 to 54. Therefore, the control circuit 36 prevents automatic reapplication of power even though the protection switch 32 automatically resets. Normally, an attendant will see the malfunction and open the stop contacts 49 to determine the cause of the malfunction. When this occurs, current ceases to flow through the resistor 47 and it will cool down to below its transition or critical temperature. Subsequently, after the cause of the malfunction has been removed, the contacts 48 and 49 are closed, current flows through the resistor 47 and the main contactor coil 51, and the contacts 52 through 54 close. The system then continues in normal operation as previously explained.

It will be apparent that the control circuit protects the motor against automatic recycling or reapplication of power even though the thermal protector switch 32 automatically resets. As previously mentioned, automatic resetting is usually undesirable, particularly in larger size motors, because you normally want an attendant to become aware of the malfunction and investigate the cause. Further, the circuit will protect the motor even though any one of the three power lines 27 through 29 opens. If the power line 27 opens, the control circuit 36 operates as described above. If one of the two power lines 28 and 29 opens, the motor will operate as a single phase motor with the remaining two windings. For example, if the power line 28 opens, the motor will operate as a single phase motor with current flowing through the two power lines 27 and 29. Since current flows through the loop 43, the contacts 46 will remain closed. However, the motor will very quickly overheat and the thermal protector switch 32 will open. As soon as this happens, current also stops flowing through the power lines 27 and 29, the contacts 46 open and the main contactor 50 opens. Thus, the motor is protected in all circumstances, and automatic resetting is prevented. A protector switch such as the switch 32 could also be connected in the lines 28 and 29 and the circuit would also operate as described above, and the control circuit would also protect the motor against malfunction due to random resetting of the protector switches because the control circuit would prevent the reapplication of power unless the control circuit is manually reset.

Figure 2:
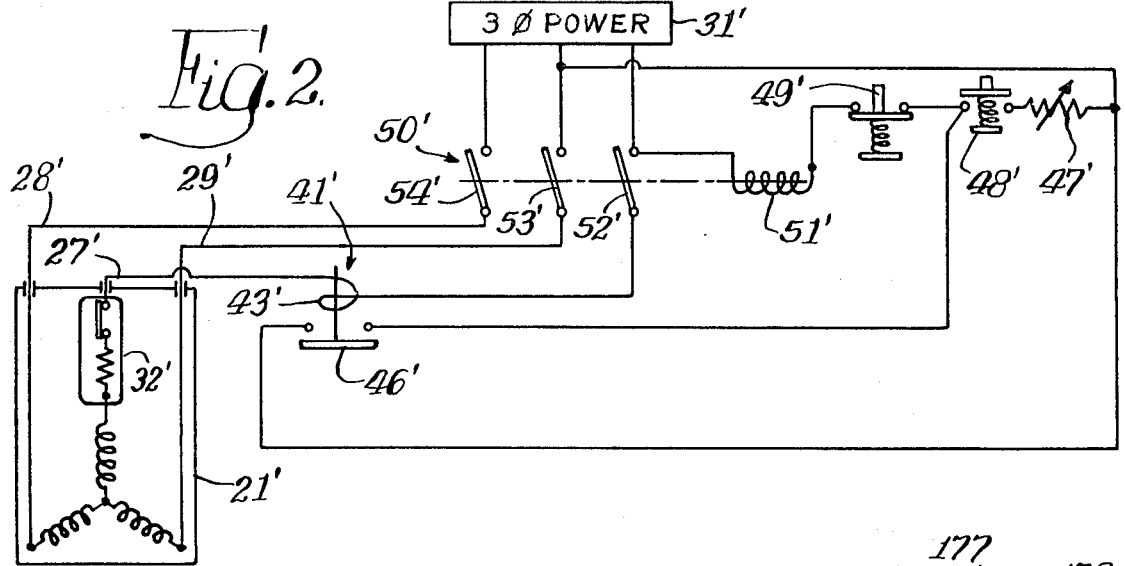

The system shown in FIG. 2 similar to that shown in FIG. 1 and therefore the same reference numerals are used. The numerals in FIG. 2 are however primed to distinguish from FIG. 1. In FIG. 2, the contactor coil 51', the normally closed stop contacts 49', the normally open start contacts 48', and the PTC resistor 47' are again connected in series across the power lines 27' and 29'. However, the contacts 46' of the control relay 41' are connected across both the PTC resistor 47' and the contacts 48' instead of across the PTC resistor only as in the circuit of FIG. 1. The contacts 48' and 49' are in the example of FIG. 2, manually operated types, the contacts 48' being spring loaded to its normally open position and the contacts 49' being spring loaded to its normally closed position. Either of the contacts 48' or 49' may be momentarily actuated to its other position by manual operation.

To start the motor 21', the start switch 48' is momentarily closed, enabling current to flow through the coil 51'. The contacts 52', 53' and 54' close, current flows through the lines 27', 28' and 29', and the energized coil 43' closes the contacts 46'. The start contacts 48' may then be released because the contactor coil 51' will continue to be energized through the contacts 46'.

To stop the motor 21' during normal operation, an operator momentarily presses the stop contacts 49' to interrupt current flow through the coil 51' and thereby open the contacts 52', 53' and 54'. The contacts 46' then open, after which the operator may release the stop contacts 49' and enable them to return to their normally closed position. In the event the motor 21' overheats due to a fault and the switch 32' opens, the lack of current through the coil 43' results in opening of the contacts 46' and deenergization of the contactor coil 51' and the motor 21'. The motor can be restarted only by reclosing the start contacts 48'. However, if the fault continues, the switch 32' will remain open, and closure of the contacts 48' results in current flow through the coil 51' and the PTC resistor 47'. Power will be applied to the motor 21' momentarily, until the PTC resistor 47' heats up sufficiently to drop the current flow through the coil 251 to the value where it opens the contacts 52', 53' and 54'. Thus, the PTC resistor 47' prevents the main contactor 50' from closing after the switch 32' has opened, even though an operator holds the contacts 48' closed.

The form of the invention illustrated in FIG. 3 is the same as the form illustrated in FIG. 1 with the exception of the construction of the control relay. In FIG. 3 the control relay 64 comprises three loops 66 to 68 formed respectively in three power lines 61 to 63. Each of the three loops 66 to 68 is respectively associated with relay contacts 71, 72 and 73 which are not mechanically coupled and therefore may operate independently of each other. The three contacts 71 to 73 are connected in series and are connected between conductors 75 and 76 which lead to the remainder of the control circuit. A timing device 74 in the form of a PTC resistor is once again connected across the two conductors 75 and 76, in parallel with the serial connection of the contacts 71 to 73. The remainder of the power circuit and the control circuit may be identical with that shown in FIG. 1.

When current flows through the three power lines 61 to 63, the current flow through each of the loops 66 to 68 causes closure of the associated contacts 71 to 73. Neglecting for the time being the PTC resistor 74, and assuming that the start and stop contacts (not shown in FIG. 3) are both closed, it will be apparent that current will flow through conductors 75 and 76 to the main contactor coil only when all three contacts 71 to 73 are simultaneously closed. Consequently, the three contacts 71 through 73 operate as an AND circuit requiring current flow through all of the power lines 61 to 63. If current flow through any of the three power lines 61 through 63 should cease, due to opening of one of the three power lines or to opening of a thermal protector switch connected in one of the lines, the lack of current flow through one of the loops 66 to 68 will result in opening of the contactor (not shown in FIG. 3) after the expiration of the timing period of the resistor 74. As described in connection with FIG. 1, current will flow through the two conductors 75 and 76 and through the PTC resistor 74 for a very short time until the temperature of the PTC resistor 74, due to self heating, rises above its transition or critical temperature at which time the current flow through the main contacting coil 51 is essentially stopped.

It will be apparent that the circuit of FIG. 3 will operate generally similarly to the circuit of FIG. 1 except that the thermal protector switch does not have to be connected in the same power line as the coil of a control relay as in FIG. 1. Consequently, the circuit of FIG. 3 has the advantage of not being subject to improper installation.

The circuit shown in FIG. 4 is generally similar to the circuit shown in FIG. 1 but illustrates the invention as applied to a single phase motor. The motor includes a winding 81 and a rotor 82, the winding 81 being connected to a single phase AC power supply 85 by two power lines 83 and 84. A thermal protector switch 86 is connected in the line 83 and is mounted on the winding 81. The switch 86 once again includes a heater element 87 and a heat responsive normally closed switch 88. Connected in the line 84 is a control relay 91 which comprises a loop 92 formed in the line 84. It should be understood that, while the loop 92 has been shown as formed in the line 84, it could as well be formed in the line 83. The control relay 91 further includes normally open contacts 93 which are connected in series with a main contactor coil 97, a normaly closed stop switch 101 and a normally open start switch 102, these components being connected across the power lines 83 and 84 for energization. The coil 97 controls the operation of normally open contacts 98 and 99 which are connected in the power lines 83 and 84. A timing device in the form of a PTC resistor 94 is once again connected across the contacts 93 of the control relay 91.

Considering the operation of the form of the invention illustrated in FIG. 4, assume that the motor is off because the start switch 102 is open. The protector switch 86 is at normal temperature and consequently the contacts 88 are closed. The PTC resistor 94 is also at normal temperature and therefore its resistance is below its critical or transition level. The contacts 93 are open due to lack of current flow through the power line 84 and the loop 92.

To place the motor in operation, the switch 102 is closed. Current then flows through the lines 83 and 84 and the control circuit including the coil 97, the PTC resistor 94 and the switches 101 and 102. Sufficient current flows through the PTC resistor 94 at this time due to the fact that its temperature is low and therefore the coil 97 operates to close the contacts 98 and 99.

Current then flows through the lines 83 and 84 to the motor winding 81, and through the loop 93, thereby closing the contacts 93 and shorting the PTC resistor 94. Once the contacts 93 are closed, the coil 97 continues to be energized and holds the main contacts 98 and 99 closed, and the resistor 94 cools. The motor then continues in normal operation until, for any reason, the motor overheats or one of the power lines 83 and 84 opens. Assuming that the motor overheats, the contacts 88 open and current stops flowing through the motor winding 81 and through the control relay loop 92. The contacts 93 immediately open, but current continues to flow momentarily through the main contactor coil 97 due to the initial low resistance value of the PTC resistor 94. The contacts 98 and 99 thus remain closed momentarily until the PTC resistor 94 heats up, due to self heating, to above its critical temperature and reduces the current flow through the main contactor coil 97. The contacts 98 and 99 then open and deenergize the motor, and even though the thermal protector switch 86 may subsequently reclose automatically, the motor will not be reenergized until one of the switches 101 or 102 is opened long enough for the resistor 94 to cool. If the contacts 88 reclose while the switches 101 and 102 are closed, the contacts 98 and 99 will remain open because of the continued high resistance of the PTC resistor 94. Normally, an attendant will see that the motor has stopped and open one of the two switches 101 or 102 and thus permit the PTC resistor 94 to cool. After the cause of malfunction has been removed, the attendant then recloses the switches 101 and 102 and the motor resumes normal operation as previously described.

Thus, the control circuit shown in FIG. 4 protects a single phase motor against continued reenergization until an attendant removes the cause of difficulty. In all of the circuits disclosed herein, if it is desired to have the motor automatically restart after a certain period of time without manual resetting, the timing device connected across the contacts of the control relay may be, instead of a PTC resistor, a type which will permit current flow through the contactor coil once again after it has stopped current flow for a period of time. The purpose of the timing device is of course to enable reenergization of the contactor coil when the control relay contacts are open, using the start and stop switches.

The form of the invention illustrated in FIG. 5 is generally similar to that illustrated in FIG. 1, but illustrates a different form of control relay, and illustrates the use of a circuit connected to the thermal protector switch for increasing the rating or current carrying capacity of the switch. In FIG. 5 is illustrated a three phase motor including phase windings 106, 107 and 108 which are connected by three power lines 109, 110 and 111, respectively, to a three phase power supply 105. The motor further includes a rotor 112, and a thermal protector switch 113 is connected in the line 110. As in the other forms of the invention, the protector switch 113 is mounted closely adjacent the three phase windings 106, 107 and 108 and therefore quickly responds to overheating of any of these windings. The switch 113 comprises a heater element 114 and normally closed switch contacts 115. Connected across the contacts 115 is a TRIAC 117, the gate of the TRIAC being connected by a resistor 118 to the other side of the heater element 114 of the switch 113. The TRIAC 117 is momentarily turned on when the contacts 115 open in order to protect the contacts against arcing. The construction and operation of the TRIAC circuit to increase the rating of the protector switch is illustrated and described in detail in the previously mentioned copending patent application of E.J. Schaefer et al. Ser. No. 354,694. While such a TRIAC circuit is shown only in the circuit of FIG. 5, it should be understood that it could also be used with any of the forms of the invention disclosed herein.

The three lines 109, 110 and 111 are connected by three normally open contacts 121 to 123 of a main contactor to the three phase AC power supply 105. The three contacts 121 to 123 are operated by a contactor coil 124, this arrangement being the same as that shown in FIG. 1. The coil 124 is connected in series with a normally closed stop switch 126, a normally open start switch 127 and a PTC resistor 128, the foregoing components being connected across the power lines 109 and 110.

The normally open contacts 129 of a control relay 131 are connected across the PTC resistor 128. The control relay 131 further includes a coil 133 connected in series with a secondary winding 134 which is inductively coupled to a primary winding 138. The winding 138 is formed by a loop in the power line 110 and when current flows through the power lines, current is induced in the secondary winding 134. It will be noted that the winding 138 is connected in the same power line 110 as the protector switch 113.

Figures 6, 7:
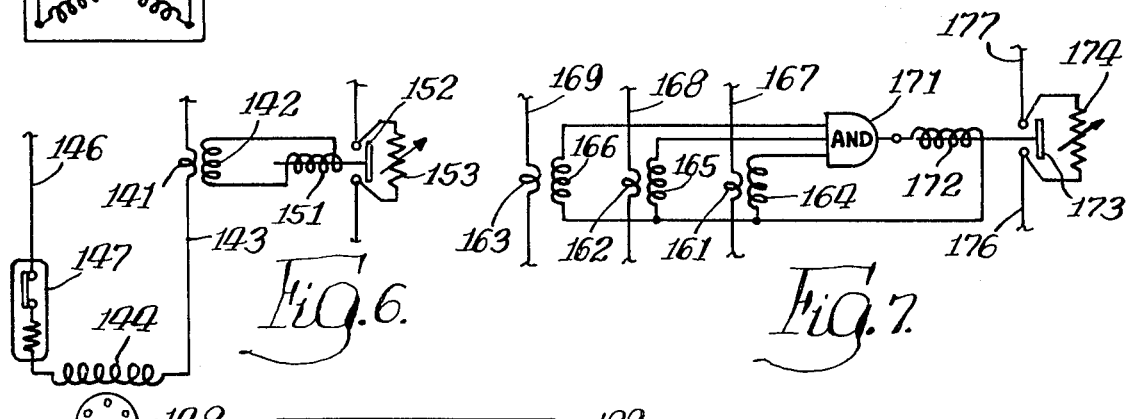
FIG. 6 is a diagram similar to FIG. 4 but showing another alternate form.
FIGS. 7 and 8 are diagrams similar to FIGS. 1 to 3 and 5 but showing still additional forms of the invention.

The circuit in FIG. 6 is similar to the circuit shown in FIG. 4, the difference once again being in the arrangement of the control relay. The control relay in FIG. 6 comprises a current transformer including a primary winding 141 and a secondary winding 142, the primary winding 141 being formed as by a loop in a power line 143 leading to a winding 144 of a single phase motor. A second power line 146 is also connected to the motor winding 144, and a thermal protector switch 147 is connected in the line 146. The motor further includes a rotor 148 which of course is driven when current flows through the winding 144. When current flows through the line 143, current is induced in the secondary winding 142 which is connected across the coil 151 of a relay including contacts 152. A PTC resistor 153 is connected across the contacts 152. The contacts 152 and the PTC resistor 153 correspond to the contacts 93 and the resistor 94 of the circuit shown in FIG. 4, and are connected in a control circuit which may be identical in other respects with the control circuit shown in FIG. 4. If for some reason current stops flowing through the motor winding 144 due for example to opening of the switch 147, current stops flowing through the line 143 and the coil 151 is no longer energized, resulting in opening of the contacts 152. As previously explained with regard to the FIG. 4 circuit, this results in opening of the main contactor after the PTC resistor 153 has heated sufficiently.

The circuit shown in FIG. 7 includes current transformers similar to the circuit shown in FIG. 5 but differs once again in the arrangement of the control relay. In FIG. 7, a control relay circuit is provided including three primary windings 161, 162 and 163 coupled with secondary windings 164, 165 and 166. The three windings 161 to 163 are formed by loops in three power lines 167, 168 and 169. One side of each of the secondary windings 164 to 166 is connected to one input of an AND gate logic element 171, and the other side of each of the secondary windings is connected to one side of a relay coil 172. The other side of the coil 172 is connected to the output of the AND gate 171. The coil 172 is part of a relay including contacts 173, and a PTC resistor 174 is connected across the contacts 173. Two conductors 176 and 177 connect the contacts 173 and the PTC resistor 174 to the remainder of a control circuit which may be identical in other respects with the control circuit illustrated, for example, in FIG. 5. The power circuit may also be the same as that shown in FIG. 5.

Assuming that the contacts of the main contactor are closed and that the thermal protector relay is closed, current flows through the three power lines 167 to 169 to the motor, and current flows through each of the windings 164 to 166, through the AND gate 171 and through the winding 172, closing the contacts 173 and operating the control circuit as previously described. If any of the lines 167 to 169 opens, current does not flow through the associated winding 164 to 166, the gate 171 closes, and the relay coil 172 is not energized.

Figure 8:
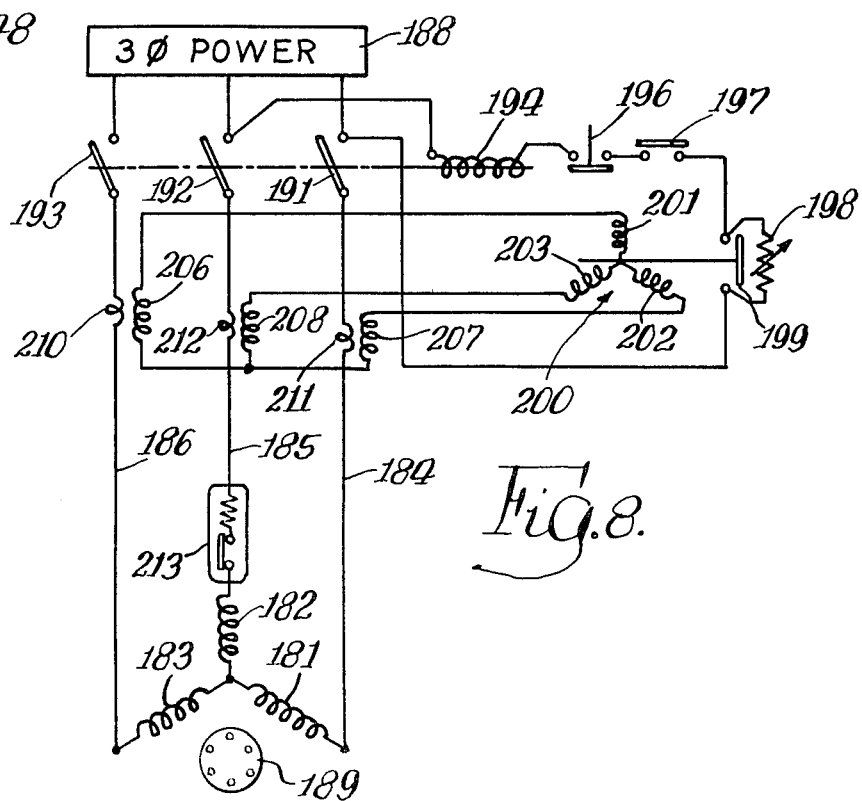

FIG. 8 illustrates still another three phase system but with another arrangement for sensing current flow through the three power lines. FIG. 8 illustrates a three phase electric motor including phase windings 181, 182 and 183 which are connected by three power lines 184, 185 and 186 to a three phase AC power supply 188. Of course, the electric motor also includes a rotor 189. The contacts 191, 192 and 193 of the main contactor are connected in the three power lines and operated by a coil 194. The energizing circuit for the coil 194 includes a stop switch 196, a start switch 197, and a PTC resistor 198, the foregoing elements being connected in series across the power lines 184 and 185. Connected across the PTC resistor 198 are normally open contacts 199. It will be apparent that the foregoing arrangement of components is generally similar to that described in connection with FIG. 1.

To operate the contacts 199, the movable element of the contacts 199 is connected to be operated by what is, in effect, a miniature three phase motor 200 including windings 201, 202 and 203. The movable element of this three phase motor 200 is connected to operate the contacts 199. The three windings 201 to 203 are respectively connected to three secondary windings 206, 207 and 208 which are inductively coupled with three primary windings 210, 211 and 212 of three current transformers. When current flows through the three power lines 184 to 186, the windings 206, 207 and 208 are excited, and the stall torque of the motor 200 closes the contacts 199. In the event any one of the three power lines 184, 185 and 186 should open, as by breakage or by opening of a thermal protector switch 213 connected in the line 185, the motor 200 will operate as a single phase motor. As is well known, with single phase excitation the motor 200 will have no torque, and consequently, the contacts 199 will open. The remainder of the operation of the system is identical with that described in the previous form of the invention. As soon as current flow resumes in the three lines 184, 185 and 186, the torque of the motor 200 closes the contacts 199. Of course, the PTC resistor 188 introduces a time delay as previously explained.

It will be apparent from the foregoing that novel and useful protection systems for single phase and three phase electric motors have been provided. The systems sense the opening of a thermal protector switch by sensing the absence of current flow in a power line, and then open the power contactor. The system also requires manual resetting after an automatic thermal protector switch has opened, and it prevents random resetting of protectors in the event more than one protector is used.

The system responds to overheating of the motor because the thermal protector switch is mounted in heat exchange relation with the motor windings. The thermal protector switch may be mounted closely adjacent the windings or, in the case of a motor filled with a fluid, it may be mounted to sense the temperature of the fluid.

I claim:

1. A system for protecting an electric motor including at least one winding connected to a power supply by a plurality of power lines, said system comprising a thermal protector switch adapted to be connected in a selected line, said switch further being mounted in heat exchange relation with said winding, a contactor connected in said power lines for controlling the application of power to said motor, and current sensing circuit means coupled to at least one of said power lines including said selected line for sensing the presence or absence of current flow therethrough, said current sensing circuit means being connected to said contactor and actuating said contactor to open said power lines in the absence of current flow through said one power line.

2. A system for protecting an electric motor including at least one winding connected to a power supply by a plurality of power lines, said system comprising a thermal protector switch adapted to be connected in a selected line, said switch further being mounted in heat exchange relation with said winding, a contactor connected in said power lines for controlling the application of power to said motor, and current sensing circuit means coupled to at least one of said power lines including said selected line for sensing the presence or absence of current flow therethrough, said current sensing circuit means being connected to said contactor and actuating said contactor to open said power lines in the absence of current flow through said one power line, said contactor including a coil, and said current sensing circuit means including control contacts which are actuated by current flow through said power lines, switch contacts, means serially connecting said control contacts, said switch contacts and said contactor coil to a power supply, and timing means connected across said control contacts for momentarily enabling current flow through said coil when said switch contacts are closed and said control contacts are open.

3. A system as in claim 2, wherein said timing device comprises a PTC resistor connected across said control contacts.

4. A system as in claim 2, wherein said timing device comprises a PTC resistor, said control contacts being connected across both said PTC resistor and said switch contacts.

5. A system as in claim 1, wherein said thermal protector switch includes normally closed contacts, and further including a TRIAC connected across said normally closed contacts, and means connected in series with said contacts and responsive to current flow through said contacts for turning said TRIAC momentarily on when said normally closed contacts open.

6. A system as in claim 1, wherein said current sensing means comprises a control relay including a coil and control contacts, said coil being formed by a loop in said selected power line, and said control contacts being connected to control operation of said contactor.

7. A system as in claim 1, wherein said current sensing means comprises a current transformer including a primary winding and a secondary winding, said primary winding being connected in said selected power line, and said secondary winding being connected to control operation of said contactor.

8. A system as in claim 1, wherein said motor is a three phase motor and there are three power lines, and said current sensing means is coupled to all three power lines.

9. A system as in claim 8, wherein said current sensing means comprises a loop formed in each of said lines, each of said loops being magnetically coupled to a relay plunger which actuates a normally open set of relay contacts, said relay contacts being connected in series and connected to said contactor, whereby the circuit to said contactor is closed only when current flows through all three of said power lines and closes all of said sets of contacts.

10. A system as in claim 8, wherein said current sensing means comprises a current transformer for each of said lines, each transformer including a primary winding connected in a power line and a secondary winding, the secondary windings of said transformers being connected to control operation of said contactor.

11. A system as in claim 10, wherein said secondary windings are connected to an AND gate, a relay coil being connected to the output of said AND gate and said coil being energized only when current is induced in each of said secondary windings.

12. A system as in claim 10, wherein said secondary windings are connected to the three windings of a miniature three phase motor, said miniature motor including a movable element which controls operation of a relay, and said relay controlling operation of said contactor.

13. A circuit for use with an electric motor connected to a power supply by power lines, the circuit including an automatically resettable thermal protector switch connected in a selected one of the lines and mounted in heat exchange relation with a motor winding, current sensing means coupled to at least one of said lines including said selected power line for sensing the presence or absence of current flow therethrough, a main contactor connected in said power lines for controlling the application of power to said motor, said current sensing means being connected to said contactor for actuating said contactor to open said lines in the absence of current flow through said selected of said lines and means for preventing automatic reenergization of the motor after opening of said switch.

14. A protector circuit for protecting a three phase load against damage, three power lines being provided to connect said load to a three phase power supply, comprising automatically resetable thermal protector means connected in one of said lines and mounted in heat exchange relation with said load, power contactor means adapted to be connected in said three power lines for simultaneously opening or closing said lines, said contactor means including electrically responsive means for actuating said contactor to open or close said lines, control circuit means connected to said responsive means and electrically coupled to at least one of said three power lines, said control circuit means responding to current flow through said three power lines and actuating said contactor means to open said lines when current ceases to flow through said lines, reset switch means in said control circuit for actuating said contactor to close said lines, and timing means in said control circuit enabling resetting of said contactor means but preventing automatic resetting thereof.

15. An electric motor and protection circuit, comprising an electric motor including at least one winding adapted to be connected to a power supply by a plurality of power lines, a thermal protector switch mounted in said motor in heat exchange relation with said winding, said switch being connected in one of said power lines, a contactor connected in said power lines for controlling the application of power to said motor, and current sensing circuit means coupled to said one power line and responding to operation of said switch by sensing the presence or absence of current flow through said one line, said current sensing circuit means being connected to said contactor and actuating said contactor to open said power lines in the absence of current flow through said one power line.

* * * * *